United States Patent
Ozawa

(10) Patent No.: US 8,797,960 B2
(45) Date of Patent: *Aug. 5, 2014

(54) GATEWAY APPARATUS, METHOD AND COMMUNICATION SYSTEM

(75) Inventor: Kazunori Ozawa, Tokyo (JP)

(73) Assignee: NEC Corporation, Tokyo (JP)

( * ) Notice: Subject to any disclaimer, the term of this patent is extended or adjusted under 35 U.S.C. 154(b) by 90 days.

This patent is subject to a terminal disclaimer.

(21) Appl. No.: 13/383,165

(22) PCT Filed: Jul. 8, 2010

(86) PCT No.: PCT/JP2010/061604
§ 371 (c)(1),
(2), (4) Date: Jan. 9, 2012

(87) PCT Pub. No.: WO2011/004859
PCT Pub. Date: Jan. 13, 2011

(65) Prior Publication Data
US 2012/0106459 A1    May 3, 2012

(30) Foreign Application Priority Data
Jul. 8, 2009 (JP) .................................. 2009-161955

(51) Int. Cl.
*H04W 4/00* (2009.01)
*H04W 36/00* (2009.01)

(52) U.S. Cl.
USPC ............................. 370/328; 370/338; 455/436

(58) Field of Classification Search
CPC ............................. H04L 12/6418; H04L 12/66
USPC .................................... 370/328, 338; 455/436
See application file for complete search history.

(56) References Cited

U.S. PATENT DOCUMENTS

2009/0156213 A1* 6/2009 Spinelli et al. ................ 455/436
2009/0323813 A1* 12/2009 Maciel de Faria et al. ....................... 375/240.16
2012/0082150 A1* 4/2012 Ozawa ........................ 370/338

FOREIGN PATENT DOCUMENTS

| JP | 2002112256 A | 4/2002 |
| JP | 2003101581 A | 4/2003 |
| JP | 2006121251 A | 5/2006 |
| JP | 2007-310645 A | 11/2007 |
| JP | 2007312148 A | 11/2007 |

OTHER PUBLICATIONS

Hyo-moon Jeong et al., Design of Home Network Gateway for Real-Time A/V Streaming between IEEE 1393 and Ethernet, May 2007, IEEE Transcations on Consumer Electronics, vol. 53, No. 2, p. 390-396.*
International Search Report for PCT/JP2010/061604 mailed Aug. 3, 2010.
Japanese Office Action for JP Application No. 2011-521954 mailed on Jul. 16, 2013 with Partial English Translation.

* cited by examiner

*Primary Examiner* — Un C Cho
*Assistant Examiner* — Fangyan Deng
(74) *Attorney, Agent, or Firm* — Sughrue Mion, PLLC

(57) ABSTRACT

A femtocell gateway apparatus arranged on a mobile IMS network comprises a conversion unit that when receiving a request from a terminal via a mobile network, transfers the request to a femtocell access point located in a home, reads a stream or file including at least one of video and audio, from at least one of devices connected to the femtocell access point and devices connected thereto via a home network, subjects the read stream or file to a conversion suitable for at least one of the capability of the terminal and the characteristics of the network, and outputs the stream or file converted. The output packet is then sent through a packet forwarding apparatus on the mobile network to the terminal.

20 Claims, 4 Drawing Sheets

GATEWAY APPARATUS, METHOD AND COMMUNICATION SYSTEM

REFERENCE TO RELATED APPLICATION

The present invention is based upon and claims the benefit of the priority of Japanese patent application No. 2009-161955 filed on Jul. 8, 2009, the disclosure of which is incorporated herein in its entirety by reference thereto.

TECHNICAL FIELD

The present invention relates to a gateway technology, and particularly to a femtocell gateway apparatus, method and system suitable for use in accessing contents in a home from a terminal outside the home via a network.

BACKGROUND

From content delivery services such as digital broadcasting, digital high-definition broadcasting, broadband, and NGN (Next Generation Network), and IPTV (Internet Protocol Television), an end user is able to download content including video and audio at home and store the content in a device such as a household hard disk recorder.

There are cases where an end user stores still image or moving image content that he himself shot using a digital camera or digital video camera in a household hard disk recorder or the like.

Services that enable an end user (an owner of content) and other limited viewers to view various video contents not only at home, but also outside the home are studied and tried. For instance, a method that enables a user to directly view content stored in a household device supporting DLNA (Digital Living Network Alliance) defined in "Proposal on Wide Area DLNA Communication System," pp. 233-237, 2008, CCNC (Consumer Communications and Networking Conference) 2008, IEEE (Institute of Electrical and Electronic Engineers) on a mobile telephone outside an home via a home gateway and share content with a specified user has been proposed.

With the increase in speed of a mobile network, technologies such as femtocell access point, Home NodeB, and Home eNodeB installed in a home and realizing high-speed communication between a mobile terminal and a device in a home by connecting the mobile terminal and by connecting to a mobile IMS (IP Multimedia Subsystem) network or mobile network have been developed.

As a home gateway apparatus achieving communication providing high security and supporting more sorts of outdoor apparatuses while reducing server load, Patent Document 1 (Japanese Patent Kokai Publication No. JP-P2007-312148A) discloses the configuration of a home gateway apparatus connected to an outdoor apparatus and an external gateway apparatus via a network and comprising a storage unit that stores information relating to a predetermined apparatus and an access control unit that controls access to the outdoor apparatus. The access control unit transmits information relating to the predetermined apparatus obtained from the storage unit to the external gateway apparatus, and when the external gateway apparatus determines that information relating to the outdoor apparatus obtained from the outdoor apparatus corresponds to the information relating to the predetermined apparatus, the access control unit controls communication with the outdoor apparatus without going through the external gateway apparatus. However, Patent Document 1 does not disclose the configuration of the present invention (described later) that identifies the type of a mobile terminal, performs conversion suitable for the type of the terminal on a video or audio signal, and sends the converted signal to the terminal.

PATENT DOCUMENT

[Patent Document 1] Japanese Patent Kokai Publication No. JP-P2007-312148A

SUMMARY

The disclosure of Patent Document 1 is incorporated herein in its entirety by reference thereto.
An analysis by the present invention on the related technology will be given below.
In the method of the related technology, the capability for decoding video depends on a terminal type of a terminal replaying content stored in a home from an outside, i.e., a mobile telephone, a PHS (Personal Handy-phone System), a note PC with a mobile data card, a game device with a mobile data card and so forth. When at least one of codec, screen size, bit rate, protocol, and file format, is different between this capability and the content stored in a home, the terminal cannot decode or display video content stored in a home.

Accordingly, it is an object of the present invention to provide a gateway apparatus, method, and communication system allowing content stored in a home to be decoded/displayed on a external terminal outside the home.

According to the present invention, there is provided a gateway apparatus comprising a control signal conversion unit that issues a request to a network element installed in a home, when receiving a request from a terminal via a mobile network, a reception unit that receives a stream or file including a video and/or audio read via the network element, a conversion unit that transcodes the stream or performs file format conversion on the stream or the file received by the reception unit according to the terminal, a protocol conversion unit that converts the protocol of the stream or the file converted by the conversion unit into a protocol corresponding to a node apparatus arranged on the mobile network, and a transmission unit that sends the stream or the file subjected to the conversion to the terminal via connection to the node apparatus using the converted protocol.

According to an aspect of the present invention, there is provided a femtocell gateway apparatus arranged on a mobile IMS (IP Multimedia Subsystem) network, that comprises a conversion unit that transfers a request to a network element installed in a home, when receiving a predetermined request from a terminal via a mobile network, reads a stream or file including a video and/or audio from at least one of devices connected to the network element and devices connected to the network element via a network, subjects the read stream or file to conversion according to the terminal, converts the protocol of the stream or the file to that of a packet forwarding apparatus on the mobile network, and sends the stream or the file to the terminal via connection to the packet forwarding apparatus.

According to another aspect of the present invention, there is provided a femtocell gateway apparatus arranged on a mobile network, that comprises a conversion unit that issues a request to a network element installed in a home when receiving a predetermined request from a terminal connected to the mobile network, reads a stream or file including a video and/or audio from at least one of devices directly connected to the network element and devices connected to the network element via a network, subjects the read stream or file to conversion according to the terminal, performs conversion to a protocol interface same as that of a radio control device, and sends the stream or the file to the terminal via connection to the switch using the protocol interface. In the present invention, the network element is any one of a femtocell access point, Home NodeB, or Home eNodeB installed in a home.

According to the present invention, there is provided a gateway method comprising:

issuing a request to a network element installed in a home, when a femtocell gateway apparatus arranged on a mobile IMS network receives a predetermined request from a terminal via a mobile network, reading a stream or file including a video and/or audio from at least one of devices directly connected to the network element and devices connected to the network element via a network, subjecting the read stream or file to conversion according to the terminal, converting the protocol of the stream or the file to that of a packet forwarding apparatus on the mobile network, and sending the stream or the file to the terminal via connection to the packet forwarding apparatus.

According to yet another aspect of the present invention, there is provided a gateway method comprising:

issuing a request to a network element installed in a home, when a gateway apparatus arranged on a mobile network receives a predetermined request from a terminal, reading a stream or file including a video and/or audio from at least one of devices directly connected to the network element and devices connected to the network element via a network, subjecting the read stream or file to conversion according to the terminal, performing conversion to a protocol interface same as that of a radio control device, and sending the stream or the file to the terminal via connection to a switch using the protocol interface. In the present invention, the network element is any of a femtocell access point, Home NodeB, or Home eNodeB installed in a home.

According to the present invention, there is provided a program causing a gateway apparatus arranged on a mobile IMS network to execute processing comprising:

issuing a request to a network element installed in a home, when receiving a predetermined request from a terminal via a mobile network, reading a stream or file including a video and/or audio from at least one of devices directly connected to the network element and devices connected to the network element via a network, subjecting the read stream or file to conversion according to the terminal, converting the protocol of the stream or the file to that of a packet forwarding apparatus on the mobile network, and sending the stream or the file to the terminal via connection to the packet forwarding apparatus. According to the present invention, there is also provided a storage medium storing the program.

According to the present invention, there is provided a program causing a femtocell gateway apparatus arranged on a mobile network to execute processing comprising:

issuing a request to a network element installed in a home when receiving a predetermined request from a terminal, reading a stream or file including a video and/or audio from at least one of devices directly connected to the network element and devices connected to the network element via a network, subjecting the read stream or file to conversion according to the terminal, performing conversion to a protocol interface same as that of a radio control device, and sending the stream or the file to the terminal via connection to a switch using the protocol interface. According to the present invention, there is also provided a storage medium storing the program.

According to the present invention, there is provided a communication system comprising a mobile network, a network element installed in a home, a gateway apparatus connected to the mobile network and network element, the mobile network comprising a node apparatus, wherein the gateway apparatus issues a request to the network element, when receiving a request from a terminal via the mobile network, the network element reads a stream or file including a video and/or audio from a device connected to the network element and sending the stream or the file read to the gateway apparatus, the gateway apparatus transcodes the stream or performs file format conversion on the stream or the file according to the terminal, converts the protocol of the stream or the file converted according to the terminal into a protocol corresponding to a node apparatus arranged on the mobile network, and sends the stream or the file subjected to the conversion to the terminal via connection to the node apparatus using the converted protocol.

According to the present invention, an external terminal is able to decode and display content in a home.

Still other features and advantages of the present invention will become readily apparent to those skilled in this art from the following detailed description in conjunction with the accompanying drawings wherein only exemplary embodiments of the invention are shown and described, simply by way of illustration of the best mode contemplated of carrying out this invention. As will be realized, the invention is capable of other and different embodiments, and its several details are capable of modifications in various obvious respects, all without departing from the invention. Accordingly, the drawing and description are to be regarded as illustrative in nature, and not as restrictive.

PREFERRED MODES

Figure 1:
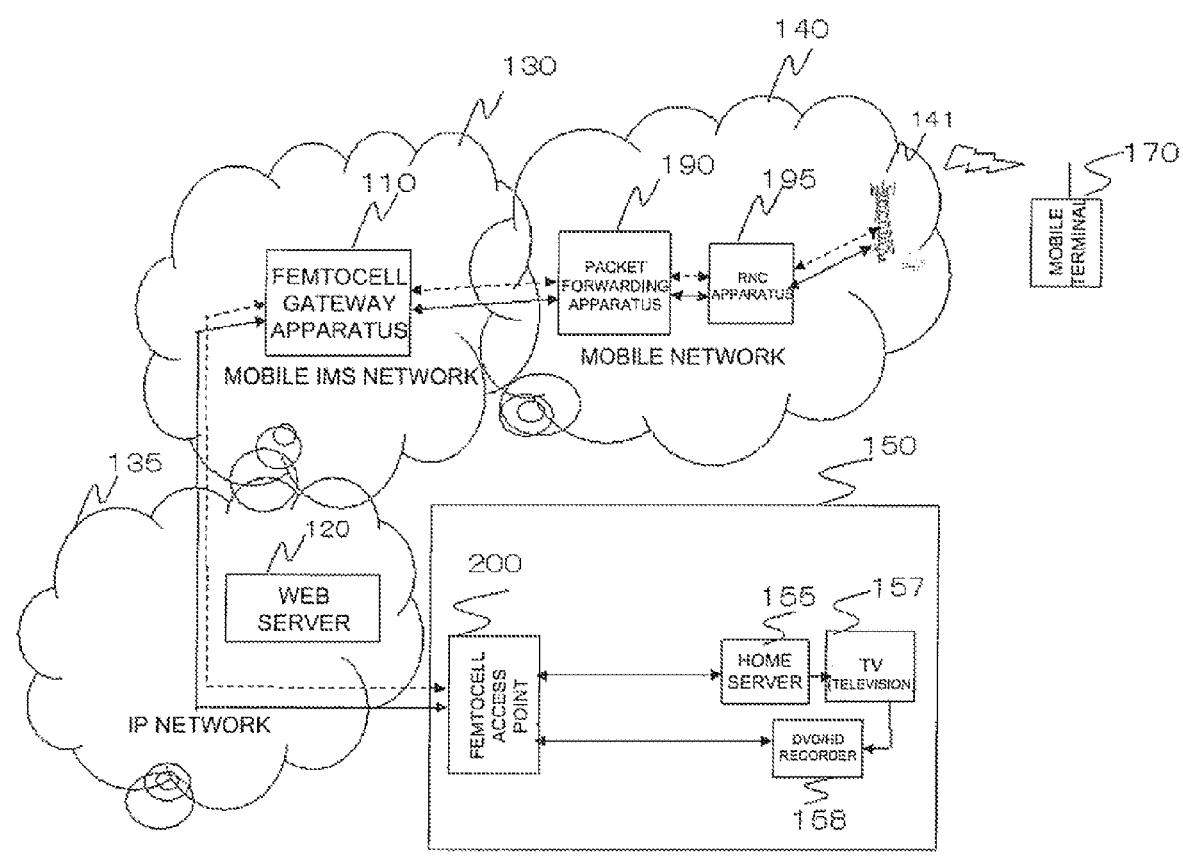
FIG. 1 is a diagram illustrating a connection configuration of a first exemplary embodiment of the present invention.

In one of modes of the present invention, there is provided a femtocell gateway apparatus enabling any a terminal type (mobile terminal) located outside of a home such as a mobile telephone, PHS, node PC with a mobile data card, game device with a mobile data card, etc. to externally decode and display a content in the home without modifying the terminal.

In one of modes of the present invention, a femtocell gateway apparatus (110) is arranged on a mobile IMS (IP Multimedia Subsystem) network (130) or a mobile network (140) and is connected to a femtocell access point (200) in a home. The femtocell gateway apparatus comprises a conversion unit that transfers a request to a femtocell access point (200)

located in a home, when receiving a predetermined request (for instance, reading a content) from a terminal (170) including a mobile telephone, reads a content including a video and/or audio from at least one of devices (157, 158) connected to the femtocell access point (200) and devices connected thereto via a home network, then subjects the content read to conversion corresponding to at least one of the capability of the terminal (170), which is a source node of the request, and the characteristics of the network, and outputs the content to the terminal (170) via the mobile network (140). In the present invention, the output packet is sent through a packet forwarding apparatus (190) on the mobile network (140) to the terminal (170).

In another aspect of the present invention, there is provided a femtocell gateway apparatus (310) that is arranged on a mobile network (140) and that comprises a conversion unit that issues a request to a femtocell access point (200) installed in a home, when receiving a predetermined request from a terminal (170) connected to the mobile network (140), reads a stream or file including a video and/or audio from at least one of devices connected to the femtocell access point (200) and devices connected to the femtocell access point via a home network, subjects the read stream or file to conversion corresponding to at least one of the capability of the terminal (170) and the characteristics of the network, performs conversion to a protocol interface same as that of a radio control device (195), and sends the stream or the file to the terminal via connection to a switch (198) using the protocol interface.

According to the present invention, the conversion by the conversion unit includes the conversion of at least one of codec, bit rate, screen resolution, frame rate, file format, and protocol.

According to the present invention, a Home NodeB or Home eNodeB may be used in a home, instead of a femtocell access point.

According to the present invention, there is provided a femtocell gateway apparatus including a mobile telephone, PHS, WiMax (Worldwide Interoperability for Microwave Access; "WiMax" is a registered trademark of the WiMax Forum) terminal, personal computer with a mobile data card, game device with a mobile data card, etc. as the terminal (170).

Figure 2:
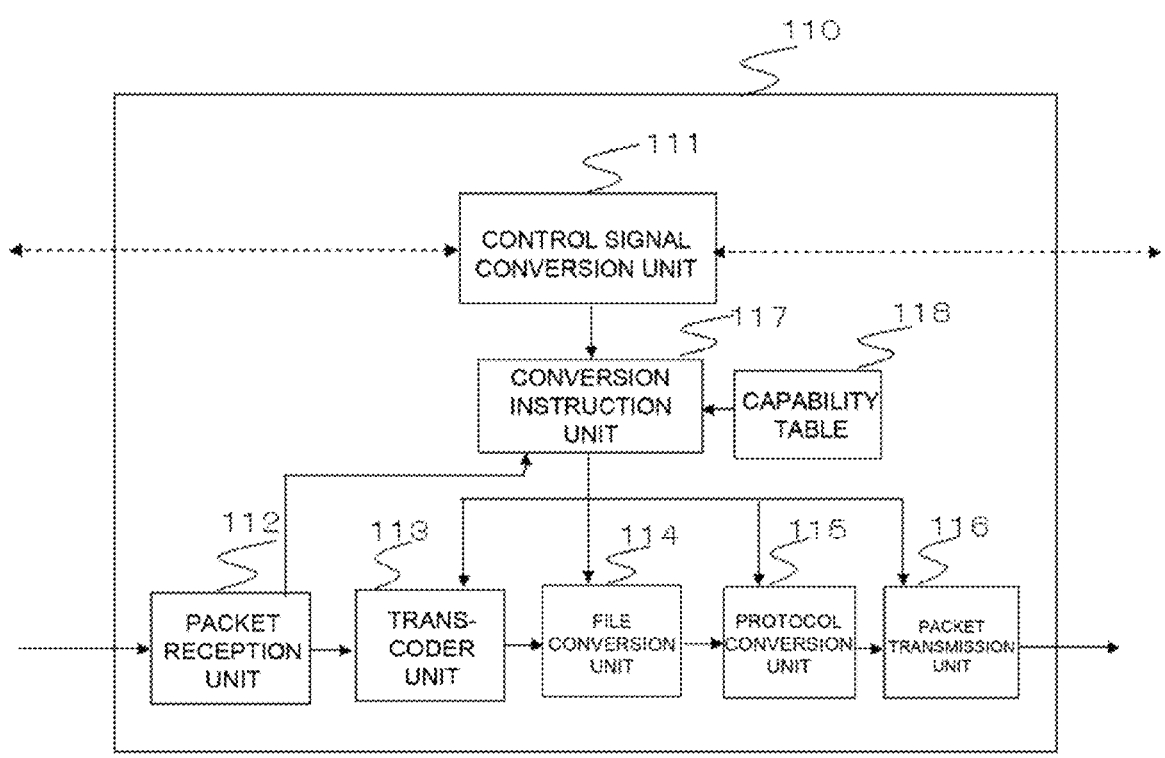
FIG. 2 is a diagram illustrating the configuration of a femtocell gateway apparatus 110 of the first exemplary embodiment of the present invention.
Figure 3:
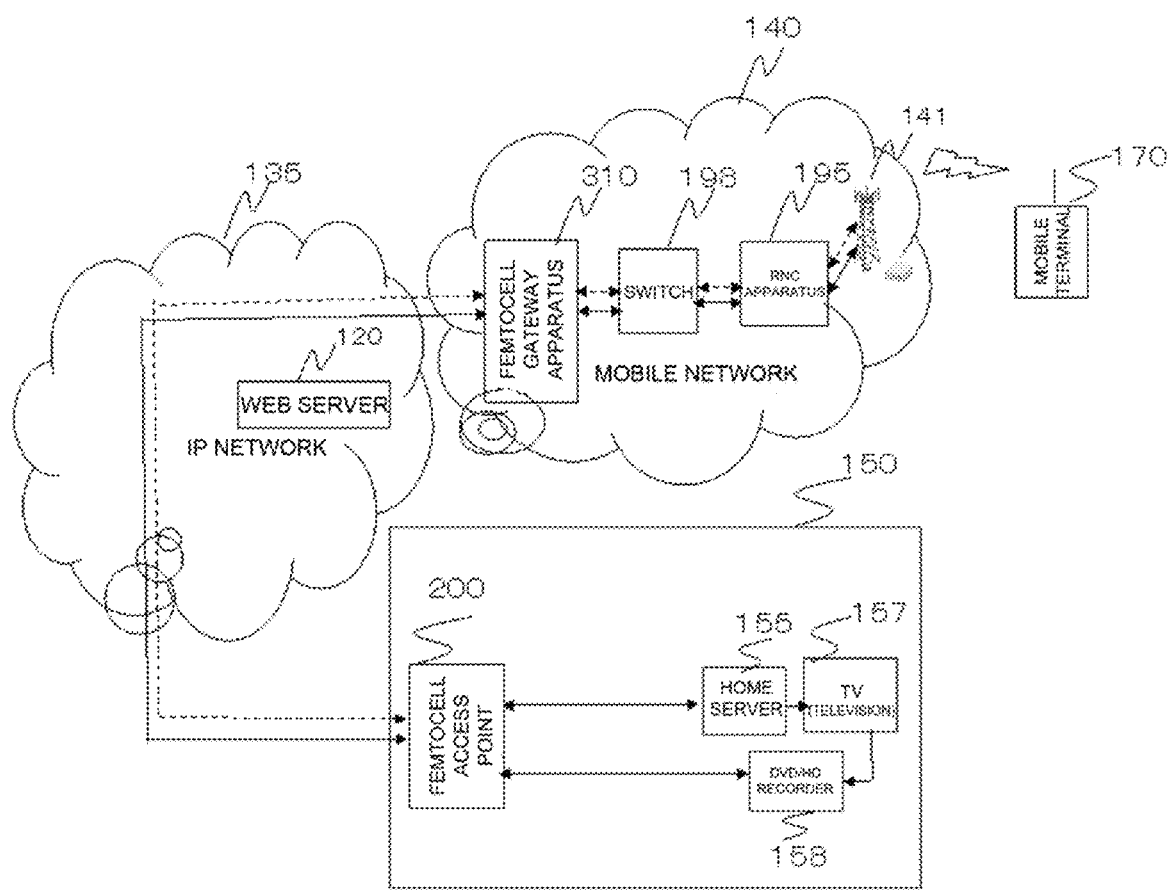
FIG. 3 is a diagram illustrating a connection configuration of a second exemplary embodiment of the present invention.

With reference to FIGS. 1 to 3, the configuration and operation of exemplary embodiments of the present invention will be described. Although a moving image is used as an example of content in configuration examples in the exemplary embodiments below, the same configurations can be used for still image, audio, and voice.

<Exemplary Embodiment 1>

FIG. 1 is a diagram illustrating a connection configuration in which a femtocell gateway apparatus according to an exemplary embodiment of the present invention is adopted. As shown in FIG. 1, a home server 155, a television 157, and a DVD (Digital Versatile Disk)/HDD (Hard Disk Drive) recorder 158 are directly connected to a femtocell access point 200 or connected thereto via a home network in a home 150. The femtocell access point 200, the home server 155, the television 157, and DVD/HDD 158 can be connected, in conformity to, for instance, the DLNA (Digital Living Network Alliance) guidelines.

The femtocell access point 200 in the home is connected to a local IP network 135 and is connected to a mobile IMS network 130 via the IP network. BB (Broadband network), NGN (Next Generation Network), or the Internet can be applied to the mobile IMS network 130, but we will assume that it is a BB (Broadband network) in the description below.

The femtocell gateway apparatus 110 is arranged on the mobile IMS network 130 and is connected to the femtocell access point 200 in the home.

The femtocell gateway apparatus 110 is connected to a packet forwarding apparatus 190 (serving/gateway General packet radio service Support Node; a node integrating SGSN (Serving General packet radio service Support Node) and GGSN (Gateway General packet radio service Support Node)), which is arranged on a mobile network 140, and sends/receives a packet.

The packet forwarding apparatus 190 is connected to an RNC (Radio Network Controller) apparatus 195 on the mobile network 140.

A mobile terminal 170 is connected to the RNC (Radio Network Controller) apparatus 195 via a radio base station 141.

We will assume that a mobile telephone is used as the mobile terminal 170 in the description below without being limited thereto.

When connecting, the mobile terminal 170 accesses a web server 120 via the mobile network 140 to perform authentication.

After the authentication, the mobile terminal 170 selects a content to be viewed on a content selection screen provided by the web server 120.

The web server 120 outputs a notification that the authentication is complete and the content selection result to the femtocell gateway apparatus 110, and notifies the mobile terminal 170 of an incoming IP address of the femtocell gateway apparatus 110.

Then, the mobile terminal 170 issues a connection request to the femtocell gateway apparatus 110. HTTP (Hypertext Transfer Protocol) over TCP/IP is used as the protocol for the connection request in the description below, however, protocols such SIP (Session Initiation Protocol) may be used.

When HTTP is used, the mobile terminal 170 is able to issue the connection request using a request command.

FIG. 2 is a diagram illustrating the configuration of the femtocell gateway apparatus 110. The femtocell gateway apparatus 110 comprises a control signal conversion unit 111, a packet reception unit 112, a transcoder unit 113, a file conversion unit 114, a protocol conversion unit 115, a packet transmission unit 116, a conversion instruction unit 117, and a capability table 118.

The control signal conversion unit 111 receives the authentication completion notification and the content selection result from the web server 120 and receives the HTTP request command from the mobile terminal 170.

The control signal conversion unit 111 identifies the terminal type of the terminal 170 by reading terminal type information described in a User-Agent header of the HTTP request command.

Examples of the terminal type information include, but not limited to, the mobile telephone manufacture and the format. Then the terminal type information is outputted to the conversion instruction unit 117.

The control signal conversion unit 111 converts the HTTP request command from the mobile terminal 170 into, for instance, a SIP (Session Initiation Protocol) INVITE message and sends it to an incoming IP address of the femtocell access point 200.

The control signal conversion unit 111 converts the content selection result into, for instance, a SIP INFO message and sends it to the femtocell access point 200.

Again, referring to FIG. 1, the femtocell access point 200 receives the SIP INVITE message from the femtocell gateway apparatus 110 and opens a session.

The femtocell access point 200 receives and analyzes the SIP INFO message from the femtocell gateway apparatus 110, identifies a video content to be read, and notifies the DVD/HDD recorder 158 thereof.

The femtocell access point 200 reads the file of the content from the DVD/HD recorder 158 and transmits the read file of the content to the femtocell gateway apparatus 110 using, for instance, RTP (Real-time Transport Protocol) via the IP network 135 and the mobile IMS network 130.

Referring to FIG. 2, from the femtocell access point 200, the packet reception unit 112 of the femtocell gateway apparatus 110 receives packets of the file of the content read from the DVD/HD recorder 158, extracts a stream stored in the content file, and outputs the stream to the transcoder unit 113.

The packet reception unit 112 reads content information (for instance, the compression encoding format, the screen resolution of the video, the bit rate, the frame rate, the duration of the video content, the audio compression encoding format, the duration of the audio content etc.) stored in the content file and outputs the information to the conversion instruction unit 117.

The conversion instruction unit 117 receives the terminal type information from the control signal conversion unit 111, receives the content information from the packet reception unit 112, and determines what kind of conversion will be performed by the transcoder unit 113.

For instance, according to the content information, the video content read from the DVD/HD recorder 158 is recognized to be compression-encoded in accordance with MPEG 2 MP (Main Profile) at 8 Mbps (megabits per second) and the screen resolution thereof is SD (729×480 pixels) with a frame rate of 30 fps (frames per second). From the terminal type information, the mobile terminal 170 is recognized to be a new model of mobile telephone.

The conversion instruction unit 117 holds capability information corresponding to a terminal model as listed below in the capability table 118 in advance.
Allowable codec
Screen resolution
Frame rate
Receivable file format and file size
Receive protocol The conversion instruction unit 117 reads appropriate capability information from the capability table 118 for each terminal according to the terminal type information.

In the present exemplary embodiment, since the terminal is a new model, the capability information read from the capability table 118 indicates H.264 encoding at 512 kbps and QVGA (Quarter Video Graphic Array: 320×240 pixels) screen resolution with a frame rate of 30 fps.

The conversion instruction unit 117 creates conversion information for performing conversion between the content information and the capability information of the terminal (for instance, decoding MPEG-2 MP, converting the screen resolution from SD into QVGA, encoding with H.264 at 512 kbps with a frame rate of 30 fps, etc.), and outputs the created conversion information to the transcoder unit 113.

The conversion instruction unit 117 outputs the read capability information to the file conversion unit 114, the protocol conversion unit 115, and the packet transmission unit 116.

The transcoder unit 113 receives the stream extracted from the packet reception unit 112, receives the aforementioned conversion information (for instance, decoding MPEG-2 MP, converting the screen resolution from SD into QVGA, encoding with H.264 at 512 kbps with a frame rate of 30 fps, etc.) from the conversion instruction unit 117, activates the transcoder unit that operates in real time based on the information received, performs conversion on the stream (for instance, performing MPEG-2 MP decode, screen resolution conversion from SD into QVGA, H.264 encode at 512 kbps with a frame rate of 30 fps, etc., on the received stream), and outputs the converted stream to the file conversion unit 114.

The file conversion unit 114 receives the capability information of the mobile terminal 170 from the conversion instruction unit 117, receives the converted stream from the transcoder unit 113, and converts the stream into a file format according to the capability information for supply to the mobile terminal 170.

As the file format, there are, for instance, 3GPP, 3GPP2, and MP4, and the acceptable file format depends on the model of the mobile terminal. The file conversion unit 114 determines which file format is used according to the capability information, generates a file according to the determined file format, stores the converted stream therein, and outputs the file to the protocol conversion unit 115. For instance, for details of the 3GPPP [3GPP?] file format, refer to the 3GPP TS 26.244 standard.

The protocol conversion unit 115 receives the capability information from the conversion instruction unit 117, determines a protocol that the packet forwarding apparatus 190 is able to receive, receives the file from the file conversion unit 114, and sends the file via this protocol. GTP (GPRS Tunneling Protocol) is used as the protocol. The file having file format thereof loaded is outputted to the packet transmission unit 116 according to GTP/UDP (User Datagram Protocol)/IP (Internet Protocol).

The packet transmission unit 116 receives the capability information from the conversion instruction unit 117, receives the protocol and the file format from the protocol conversion unit 115, and sends a GTP/UDP/IP packet to the packet forwarding apparatus 190 on the mobile network 140.

Referring to FIG. 1 again, the packet forwarding apparatus 190 receives the file over the GTP protocol, converts it into the Iu-PS protocol (UMTS (Universal Mobile Telecommunication System) interface linking the RNC to 3G SGSN (Serving General packet radio service Support Node)), and outputs the result to the RNC (Radio Network Controller) 195.

The RNC 195 converts the Iu-PS protocol into the TCP/IP protocol, selects the radio base station 141 in a service area of the mobile terminal 170, and sends a packet to the mobile terminal 170 via the radio base station 141.

The mobile terminal 170 receives the content file via the mobile network 140 according to the TCP/IP protocol, extracts a stream from the files, decodes, plays back, and displays the stream.

The first exemplary embodiment is described in the above. The exemplary embodiment above is merely an example, and the network 135 can be an NGN (Next Generation Network) or the Internet, instead of a broadband network in another exemplary embodiment. When the mobile terminal 170 is able to receive an RTP stream, the configuration may be such that the transcoder unit 113 outputs to the protocol conversion unit 115, bypassing the file conversion unit, 114, the protocol conversion unit 115 performs the conversion to the RTP/UDP protocol, and the packet transmission unit 116 sends an RTP/UDP/IP stream to the packet forwarding apparatus 190 by tunneling over the GTP (GPRS Tunneling Protocol).

As the mobile network 140, a WiMax (Worldwide Interoperability for Microwave Access) network or LTE (Long Term Evolution) network may be used in the same configuration.

The DVD/HD recorder 158 may use known codecs other than MPEG-2 such as H.264, MPEG-4, and WMV (Windows (registered trademark) Multimedia Video) as the codec used for compression-encoding video content.

In this case, when decoding the stream received from the femtocell access point 200, the transcoder unit 113 can use H.265, MPEG-4, and WMV, instead of MPEG-2.

In a case where the stream read from the DVD/HD recorder 158 via the femtocell access point 200 is encrypted, the femtocell gateway apparatus 110 may be configured such that the stream is decrypted when extracted by the packet reception unit 112 and is outputted to the transcoder unit 113. In this case, the femtocell gateway apparatus 110 and the control signal conversion unit 111 may obtain information relating to decryption from the femtocell access point 200 or a server of the service provider, notify the conversion instruction unit 117 of this information, and then notify the packer reception unit 112.

The exemplary embodiment described above support a content in which a video signal is compressed and encoded, however the same configuration is able to support still images and audio signals.

In the exemplary embodiment described above, the processing and functions of the control signal transmission unit/reception unit [control signal conversion unit?] 111, the packet reception unit 112, the transcoder unit 113, the file conversion unit 114, the protocol conversion unit 115, the packet transmission unit 116, and the conversion instruction unit 117 in the femtocell gateway apparatus 110 shown in FIG. 2 may be realized by a program operating on a computer constituting the femtocell gateway apparatus 110. This applies to the exemplary embodiment below.

<Exemplary Embodiment 2>

FIG. 3 is a block diagram illustrating a second exemplary embodiment of the present invention. In FIG. 3, the same reference numbers are given to elements identical to those in FIG. 1 and they perform the same functions; therefore explanations of them will be omitted. Differences between the present example and the example in FIG. 1 will be mainly explained below.

A femtocell gateway apparatus 310 is arranged on the mobile network 140 and connected to the femtocell access point 200 in a home via the IP network 135.

The femtocell gateway apparatus 310 can be connected to the femtocell access point 200 in the home using protocols other than SIP or RTP.

Iu-PS protocol, the same protocol as that of the RNC, is implemented in the femtocell gateway apparatus 310, which is connected to a switch 198 using the Iu-PS protocol.

The switch 198 is connected to the RNC apparatus 195 in a service area of the mobile terminal 170 using the Iu-PS protocol.

The RNC apparatus 195 is connected to the mobile terminal 170 via the radio base station 141 in a service area of the mobile terminal 170.

Figure 4:
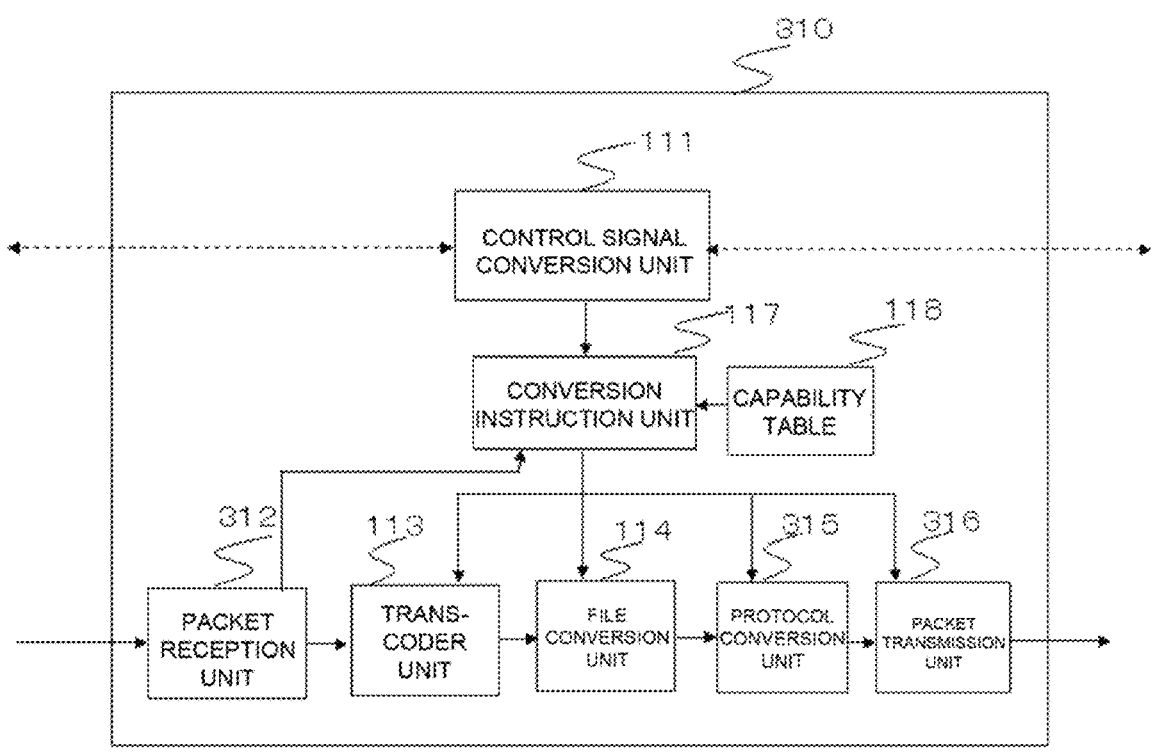
FIG. 4 is a diagram illustrating the configuration of a femtocell gateway apparatus 310 of the second exemplary embodiment of the present invention.

FIG. 4 is a diagram illustrating the configuration of the femtocell gateway apparatus 310. In FIG. 4, the same reference numbers are given to elements identical to those in FIG. 2.

A packet reception unit 312 receives a file or stream from the femtocell access point 200 in a home using not only RTP, but also a different protocol.

A protocol conversion unit 315 sends a transcoded file or stream using the Iu-PS protocol so as to connect to the switch 198.

A packet transmission unit 316 generates and sends a Iu-PS/UDP/IP packet to the switch 198.

In the configurations of both the first exemplary embodiment and the second exemplary embodiment, HSDPA (High Speed Downlink Packet Access), HSPA+ (High Speed Packet Access), LTE (Long Term Evolution), and WiMax, in addition to W-CDMA and CDMA 2000, can be used as the function of wirelessly connecting to the mobile terminal 170.

As the mobile terminal 170, a PHS, WiMax terminal, note PC in which a mobile data card is stored, and game device in which a mobile data card is stored can be used, in addition to a mobile telephone.

As the femtocell access point 200, a Home NodeB or Home eNodeB may be used.

Even when the capabilities of terminals such as a mobile telephone, PHS, note PC with a mobile data card, and game device with a mobile data card to decode a content such as a video and audio in a home via a broadband network, NGN, the Internet, or mobile network differ, an effect that various terminals can decode and display a video content in a home can obtained without modifying the terminal.

The disclosure of Patent Document is incorporated herein in its entirety by reference thereto. It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

What is claimed is:

1. A gateway apparatus comprising:
a control signal conversion unit that receives a selection result of a content from a server, said server being accessed by a terminal via a network for authentication to select the content, said control signal conversion unit, on reception of a request from a terminal via a mobile network, identifying a type of said terminal to transmit a request including information on said content selected to a network element installed in a home;
a reception unit that receives a stream or file including a video and/or audio which is said content selected by said terminal and read out via said network element to extract content information;
a conversion instruction unit that receives said terminal type information to obtain capability information corresponding to said type of said terminal, said conversion instruction unit creating conversion information for performing conversion of said stream or file based on said content information and said capability information corresponding to said type of said terminal;
a conversion unit that transcodes said stream or performs file format conversion on said stream or said file received by said reception unit in accordance with said conversion information;
a protocol conversion unit that converts a protocol of said stream or said file converted by said conversion unit into a protocol corresponding to a node apparatus arranged on said mobile network, said node apparatus including a packet forwarding apparatus connected to a radio network control apparatus provided on said mobile network, or a radio network control apparatus connected to a switching equipment provided on said mobile network; and
a transmission unit that sends said stream or said file subjected to said conversion to said terminal via connection to said packet forwarding apparatus or to said switching equipment, using said converted protocol, and via said radio network control apparatus.

2. The gateway apparatus according to claim 1, wherein said gateway apparatus includes a femtocell gateway apparatus arranged on a mobile IMS (IP Multimedia Subsystem) network, and said network element includes any one of a femtocell access point, Home NodeB, or Home eNodeB installed in a home, wherein said conversion unit transcodes said stream in accordance with said conversion information for said stream or said file read from a device installed in said home via said network element, further performs file format conversion so as to send said stream to said terminal, and stores said transcoded stream in a file in said converted file format;

said protocol conversion unit performs conversion to a protocol of said packet forwarding apparatus on said mobile network; and said transmission unit sends said stream or said file converted to said terminal via connection to said packet forwarding apparatus using said converted protocol and via said radio network control apparatus.

3. The gateway apparatus according to claim 1, wherein said gateway apparatus includes a femtocell gateway apparatus arranged on a mobile network, and said network element includes any one of a femtocell access point, Home NodeB, or Home eNodeB installed in a home, wherein said conversion unit transcodes said stream in accordance with said conversion information for said stream or said file read from a device installed in said home via said network element, further performs file format conversion so as to send said stream to said terminal, and stores said transcoded stream in a file in said converted file format, said protocol conversion unit performs conversion to a protocol interface same as that of said radio network control apparatus on said mobile network, and said transmission unit sends said stream or said file converted to said terminal via connection to said switching equipment on said mobile network using said protocol interface and via said radio network control apparatus.

4. The gateway apparatus according to claim 1, comprising:

a capability table that holds capability information of a terminal including at least one of allowable codec, screen resolution, frame rate, file format and file size being able to be received by said terminal, and reception protocol of said terminal in correspondence with model of a terminal, said conversion instruction unit reading capability information in correspondence with a model of said terminal from said a capability table and creating said conversion information corresponding to said capability information.

5. The gateway apparatus according to claim 1, wherein said conversion unit performs, in accordance with said conversion information corresponding to said terminal, conversion of at least one of codec, bit rate, screen resolution, frame rate, file format and file size, and protocol, in real time.

6. The gateway apparatus according to claim 1, wherein said control signal conversion unit reads terminal type information from a request command, when receiving said request command from said terminal, receives information of a content selected by said terminal, and instructs said device to read content, said reception unit receives a packet including content information acquired from a device connected to said network element and/or a device connected to said network element via a network, wherein said gateway apparatus comprises:

a capability table holding capability information including at least one of following: a allowable codec, screen resolution, frame rate, receivable file format and file size, and reception protocol, in correspondence with a terminal type;

said conversion instruction unit that receives said terminal type information from said control signal conversion unit, acquires capability information corresponding to said terminal type information from said capability table, receives said content information from said packet reception unit, creates said conversion information of said content information corresponding to said capability information and outputs said conversion information to a transcoder unit, and outputs said capability information read from said capability table to a file conversion unit, a protocol conversion unit, and a packet transmission unit, wherein said conversion unit comprises:

said transcoder unit that receives a stream extracted from said packet reception unit and performs transcoding processing corresponding to said conversion information from said conversion instruction unit; and a file conversion unit that receives said capability information of said terminal from said conversion instruction unit, receives a converted stream from said transcoder, performs file format conversion so as to send said stream to said terminal according to said capability information of said terminal, and stores said stream in said file, wherein said protocol conversion unit receives said capability information of said terminal from said conversion instruction unit, receives a file from said file conversion unit, determines a protocol corresponding to said capability information of said terminal, and sends a file using said protocol, and said transmission unit receives said capability information of said terminal from said conversion instruction unit, receives protocol and file format from said protocol conversion unit, and sends a packet to said terminal via connection to said packet forwarding apparatus or to said switching equipment arranged on said mobile network.

7. The gateway apparatus according to claim 1, wherein said terminal includes at least one of a mobile telephone, PHS (Personal Handy-phone System), wireless LAN (Local Area Network) terminal, WiMax (Worldwide Interoperability for Microwave Access) terminal, personal computer with a mobile data card, and game device with a mobile data card.

8. The gateway apparatus according to claim 2, wherein said gateway apparatus is connected to said radio network control apparatus (RNC) via said packet forwarding apparatus on said mobile network and connected to said terminal via a radio base station connected to said radio network control apparatus (RNC).

9. The gateway apparatus according to claim 3, wherein said gateway apparatus is connected to said radio network control apparatus (RNC) via said switch on said mobile network and connected to said terminal via a radio base station connected to said radio network control apparatus (RNC).

10. A gateway method by a gateway apparatus, said method comprising:

receiving a selection result of a content from a server, said server being accessed by a terminal via a network for authentication to select the content, on reception of a request from a terminal via a mobile network, identifying a type of said terminal to transmit a request including information on said content selected to a network element installed in a home;

receiving a stream or file that is said content selected by said terminal and includes a video and/or audio read via said network element to extract content information;

obtain capability information corresponding to said type of said terminal and creating conversion information for performing conversion of said stream or file based on said content information and said capability information corresponding to said type of said terminal;

transcoding said stream or performing file format conversion on said stream or said file received in accordance with said conversion information;

converting a protocol of said stream or said file converted in accordance with said conversion information into a protocol corresponding to a node apparatus arranged on said mobile network, said node apparatus including a packet forwarding apparatus connected to a radio network control apparatus provided on said mobile network, or a radio network control apparatus connected to a switching equipment provided on said mobile network; and sending said stream or said file subjected to said conversion to said terminal via connection to said packet forwarding apparatus or to said switching equipment, using said converted protocol, and via said radio network control apparatus.

11. The gateway method according to claim 10, wherein a gateway apparatus realizing said gateway method includes a femtocell gateway apparatus arranged on a mobile IMS (IP Multimedia Subsystem) network, and said network element includes any one of a femtocell access point, Home NodeB, or Home eNodeB installed in a home, wherein said method comprises:

said gateway apparatus transcoding said stream in accordance with said conversion information for said stream or said file read from a device installed in said home via said network element, further performing file format conversion so as to send said stream to said terminal, storing said transcoded stream in a file in said converted file format;

said gateway apparatus performing conversion to a protocol of said packet forwarding apparatus on said mobile network; and said gateway apparatus sending said stream or said file converted to said terminal via connection to said packet forwarding apparatus using said converted protocol and via said radio network control apparatus.

12. The gateway method according to claim 10, wherein a gateway apparatus realizing said gateway method includes femtocell gateway apparatus arranged on a mobile network, and said network element includes any one of a femtocell access point, Home NodeB, or Home eNodeB installed in a home, wherein said method comprises:

said gateway apparatus transcoding said stream in accordance with said conversion information for said stream or said file read from a device via said network element, further performing file format conversion so as to send said stream to said terminal, storing said transcoded stream in a file in said converted file format;

said gateway apparatus performing conversion to a protocol interface same as that of said radio network control apparatus on said mobile network; and said gateway apparatus sending said stream or said file converted to said terminal via connection to said switching element on said mobile network using said protocol interface and via said radio network control apparatus.

13. The gateway method, according to claim 10, comprising holding in a storage unit capability information of said terminal including at least one of allowable codec, screen resolution, frame rate, file format and file size being able to be received by said terminal, and a reception protocol of said terminal, in correspondence with model information of said terminal; and reading said capability information of said terminal corresponding to a model of said terminal from sais storage unit and creating said conversion information corresponding to said capability information.

14. The gateway method according to claim 10, comprising:

converting at least one of codec, bit rate, screen resolution, frame rate, file format, and protocol, in real time, in accordance with said conversion information corresponding to said terminal.

15. The gateway method according to claim 10, wherein said terminal includes at least one of a mobile telephone, PHS, wireless LAN (Local Area Network) terminal, WiMax terminal, personal computer with a mobile data card, and game device with a mobile data card.

16. A communication system comprising:

a mobile network;

a network element installed in a home; and a gateway apparatus connected to said mobile network and network element, said mobile network comprising a node apparatus, wherein said gateway apparatus receives a selection result of a content from a server, said server being accessed by a terminal via a network for authentication to select the content, said gateway apparatus, on reception of a request from a terminal via said mobile network, identifying a type of said terminal to transmit a request including information on said content selected to said network element, said network element reads a stream or file that is said content selected by said terminal and includes a video and/or audio from a device installed in said home and connected to said network element and sends said stream or said file read to said gateway apparatus, said gateway apparatus receives a stream or file including a video and/or audio which is said content selected by said terminal and read out via said network element to extract content information, said gateway apparatus obtains capability information corresponding to said type of said terminal and creates conversion information for performing conversion of said stream or file based on said content information and said capability information corresponding to said type of said terminal;

said gateway apparatus transcodes said stream or performs file format conversion on said stream or said file in accordance with said conversion information, converts a protocol of said stream or said file converted in accordance with conversion information into a protocol corresponding to a node apparatus arranged on said mobile network, said node apparatus including a packet forwarding apparatus connected to a radio network control apparatus provided on said mobile network, or a radio network control apparatus connected to a switching equipment provided on said mobile network, and said gateway apparatus sends said stream or said file subjected to said conversion to said terminal via connection to said packet forwarding apparatus or to said switching equipment, using said converted protocol, and via said radio network control apparatus.

17. The communication system according to claim 16, wherein said node apparatus includes said packet forwarding apparatus, said gateway apparatus includes a femtocell gateway apparatus arranged on a mobile IMS (IP Multimedia Subsystem) network, and said network element includes any one of a femtocell access point, Home NodeB, or Home eNodeB installed in a home, wherein said gateway apparatus transcodes said stream in accordance with said conversion information for said stream or said file read from a device installed in said home via said network element, further performs file format conversion so as to send said stream to said terminal, stores said transcoded stream in a file in said converted file format, performs conversion to a protocol of said packet forwarding apparatus on said mobile network, and sends said stream or said file converted to said terminal via connection to said packet forwarding apparatus using said converted protocol and via said radio network control apparatus.

18. The communication system according to claim 16, wherein said node apparatus is a radio network control apparatus, said gateway apparatus includes a femtocell gateway apparatus arranged on a mobile network, and said network element includes any one of a femtocell access point, Home NodeB, or Home eNodeB installed in a home, wherein said gateway apparatus transcodes said stream in accordance with said conversion information for said stream or said file read from a device installed in said home via said network element, further performs file format conversion so as to send said stream to said terminal, stores said transcoded stream in a file in said converted file format, performs conversion to a protocol interface same as that of radio network control apparatus on said mobile network, and sends said stream or said file converted to said terminal via connection to said switching element on said mobile network using said protocol interface and via said radio access apparatus.

19. The communication system according to claim 16, wherein said gateway apparatus holds in a storage unit thereof capability information of a terminal including at least one of allowable codec, screen resolution, frame rate, file format and file size being able to be received by said terminal, and reception protocol of said terminal in correspondence with a terminal model; and reads capability information corresponding to a model of said terminal from said storage unit and creates conversion information corresponding to said capability information.

20. The communication system according to claim 16, wherein said gateway apparatus converts at least one of codec, bit rate, screen resolution, frame rate, file format and file size, and protocol in real time, in accordance with said conversion information corresponding to said terminal.

* * * * *